United States Patent [19]
Brassat et al.

[11] Patent Number: 4,551,495
[45] Date of Patent: Nov. 5, 1985

[54] WEATHER-RESISTANT POLYAMIDES

[75] Inventors: Bert Brassat; Hans-Josef Buysch; Karl H. Hermann; Heinrich Haupt, all of Krefeld, Fed. Rep. of Germany

[73] Assignee: Bayer Aktiengesellschaft, Leverkusen-Bayerwerk, Fed. Rep. of Germany

[21] Appl. No.: 553,148

[22] Filed: Nov. 18, 1983

Related U.S. Application Data

[63] Continuation of Ser. No. 461,698, Jan. 28, 1983, abandoned.

[30] Foreign Application Priority Data

Feb. 9, 1982 [DE] Fed. Rep. of Germany ....... 3204334

[51] Int. Cl.$^4$ ................................................ C08K 5/34
[52] U.S. Cl. ........................................ 524/94; 524/119
[58] Field of Search .................................. 524/94, 119

[56] References Cited

U.S. PATENT DOCUMENTS

| 3,124,584 | 3/1964 | Weissel | 524/94 |
| 3,190,889 | 6/1965 | Shen | 524/94 |
| 3,454,586 | 7/1969 | Suh | 524/94 |
| 3,573,216 | 3/1971 | Strobel et al. | 524/207 |
| 3,637,745 | 1/1972 | Heller et al. | 524/94 |
| 4,348,495 | 9/1982 | Buysch et al. | 524/119 |

FOREIGN PATENT DOCUMENTS

| 0009115 | 4/1980 | European Pat. Off. |
| 0053098 | 6/1982 | European Pat. Off. |
| 2526317 | 1/1976 | Fed. Rep. of Germany |
| 2087399 | 5/1982 | United Kingdom |

Primary Examiner—John Kight
Assistant Examiner—Kriellion Morgan
Attorney, Agent, or Firm—Connolly and Hutz

[57] ABSTRACT

Weather-resistant polyamides stabilized by a combination of special cyclic phosphorous acid esters and certain indole derivatives.

9 Claims, No Drawings

WEATHER-RESISTANT POLYAMIDES

This application is a continuation of application Ser. No. 461,698, filed Jan. 28, 1983, and now abandoned.

Polyamide mouldings which are used without protection against the effects of weather can undergo gradual but irreversible changes in their consistuent material under the effect of light, heat, oxygen and wetness, resulting in a deterioration in their performance properties. Such irreversible changes include inter alia reductions in impact strength, breaking elongation and gloss and also pigment migration. These disadvantages can be considerably delayed by the incorporation of weathering stabilisers.

Known weathering stabilisers for polyamides are sterically hindered phenols, aromatic amines, phosphorous acid esters, metal compounds, such as copper, manganese and nickel salts or complexes, optionally in combination with synergists, such as halogen compounds, also UV-absorbers such as, for example, benzotriazole derivatives or substituted benzoic acid phenyl esters. In many cases, several substances from the above-mentioned classes may even be combined with one another.

Some of the above-mentioned stabilizers seriously affect the properties of the polyamides. Thus, metal compounds adversely affect the electrical properties of polyamides and, in combination with certain, particularly sulphidic pigments, frequently produce discolouration phenomena and can be washed out by rain. Polyamides stabilised with aromatic amines show a tendency towards serious discolouration. The effect of phenolic substances as weathering stabilisers is generally poor. Under the effect of heat, phosphorous acid esters can produce significant variations in the molecular weight of polyamides, resulting in processing difficulties. Finally, UV-absorbers have to be incorporated in polyamides in relatively high concentrations to afford any significant protection against weather, although this can result in discolouration (yellowing).

DOS No. 28 37 027 describes the use of phosphorous acid esters corresponding to the general formula (I) as stabilisers for polyamides:

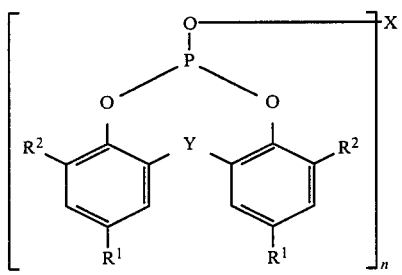

Polyamides thus stabilised show high thermal stability, high colour stability, excellent electrical properties and favourable processing behavior. However, their weather resistance is inadequate for certain applications.

It has now surprisingly been found that combinations of these phosphorous acid esters with certain indole compounds have an outstanding effect as weathering stabilisers.

Accordingly, the present invention provides weather-resistance polyamide moulding compositions containing from 0.04 to 5% by weight based on the moulding composition of a stabiliser combination consisting of (1) a phosphorous acid ester corresponding to the general formula (I):

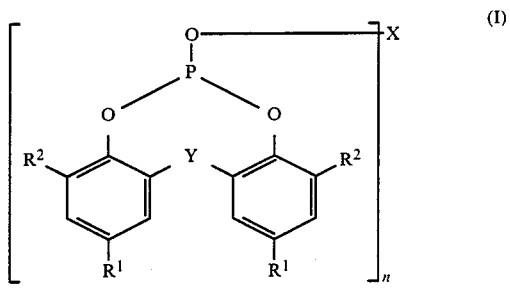

in which
$R^2$ represents a benzyl, α-methylbenzyl, α,α-dimethylbenzyl cyclopentyl or cyclohexyl radical,
$R^1$ represents an alkyl preferably with $C_1$–$C_8$, cycloalkyl preferably with $C_5$–$C_6$, aralkyl preferably with $C_7$–$C_{12}$ or aryl preferably with $C_6$–$C_{12}$ radical,
Y represents S or HC-$R^3$ where $R^3$ may represent H, an alkyl preferably with $C_1$–$C_5$ or cyclohexyl
X represents a hydrogen atom, an optionally substituted single-bond to four-bond straight chain or branched aliphatic radical preferably with $C_1$–$C_{18}$ an aralkyl radical preferably with $C_7$–$C_{12}$ or an aromatic preferably with $C_6$–$C_{12}$ radical; each of the radicals may contain olefinic double bonds and heteroatoms, preferably N, O and/or S and
n is an integer of from 1 to 4 with the proviso that,- where X=H, n=1, and
(2) an indole derivative corresponding to the general formula (II):

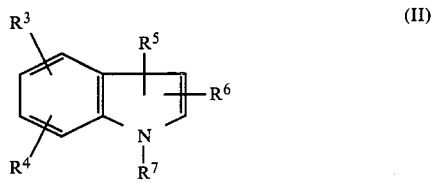

in which
$R^3$ to $R^6$ may be the same or different and represent a hydrogen atom, an alkyl preferably with $C_1$–$C_8$, aryl preferably with $C_6$–$C_{12}$, aralkyl preferably with $C_7$–$C_{12}$, cycloalkyl preferably with $C_5$–$C_6$, hydroxy, alkoxy preferably with $C_1$–$C_6$ or alkenyl preferably with $C_2$–$C_8$ radical, and
$R^7$ represents an alkenyl preferably with $C_2$–$C_{12}$ aryl preferably with $C_6$–$C_{12}$ or acyl group which may be substituted by other groups containing double or triple bonds, —$OR^8$, CN or $COOR^8$ ($R^8$=$C_1$–$C_6$-alkyl, cycloalkyl preferably with $C_5$–$C_6$).

Preferred stabilisers corresponding to formula (I) are thos in which
$R^1$ represents a methyl radical
$R^2$ represents $C_5$–$C_6$-cycloalkyl,
Y represents sulphur or —$CH_2$—, and
X represents H, phenyl or alkyl with $C_1$–$C_8$ Preferred stabilisers corresponding to formula (II) are those in which
$R^3$ to $R^5$ each represents H, $R^6$ represents a methyl group, and
$R^7$ represents (optionally substituted by CN or COOR$^8$) alkenyl with $C_2-C_8$.

Particularly preferred indole stabilisers are those corresponding to the following formula (III):

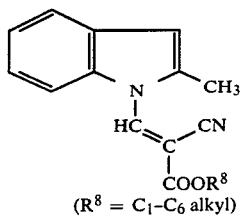

(III)

($R^8 = C_1-C_6$ alkyl)

The above-mentioned stabilisers are used in quantities of from 0.04 to 5% by weight and, preferably in quantities of from 0.1 to 2% by weight, based on moulding composition. Stabiliser (2) is used in a quantity of from 0.02 to 3% by weight and preferably in a quantity of from 0.05 to 1% by weight, based on the moulding composition.

The stabilizer combination is preferably incorporated in the polyamide melt using standard mixers. Additives of the type normally used, such as lubricants and mould-release agents, nucleating agents, pigments, dyes, fillers and reinforcing materials are optionally added in the usual quantities. Another possible method of incorporation is to add the stabiliser combination as a batch in the reactive monomer to the monomer mixture before or during polymerisation or polycondensation.

PA 6 and PA 66 may be stabilised with particular advantage.

The polyamides stabilised in accordance with invention are preferably used for the production of injection-mouldings or extruded articles for outdoor application, for example parts of vehicles, sport equipments, chairs, covers or pipes.

EXAMPLES 1 TO 12

The stabilisers indicated in Table 1 are homogeneously incorporated by means of an extruder into non-pigmented, non-reinforced polyamide-6 having a relative viscosity $\eta_{rel}$ of 3.80 (as measured in m-cresol at 20° C., c=10 g/l). The granulated material is subsequently injection-moulded to form standard small test bars which are exposed to artificial weathering in an Atlas SKB-Weatherometer. The Weatherometer is equipped with a filter lamp having 8 Corex-D-filters. The test specimens are alternately irradiated for 17 minutes and then sprayed with distilled water for 3 minutes with the lamp still on. After the periods indicated in the Table, groups of 10 test bars are removed and subjected to an impact test at $-20°$ C. in accordance with DIN 53 453. The results are set out in Table 1.

Examples 7, 8 and 9 demonstrate the effectiveness of stabiliser combinations according to the invention, the remaining examples being Comparison Examples. The codes quoted in the second column stand for compounds having the following structural formulae:

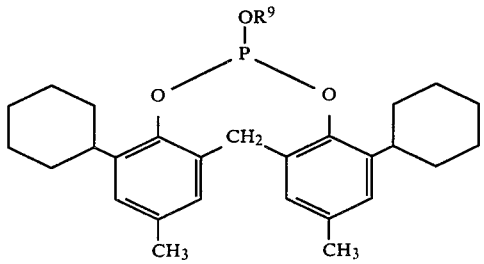

IV

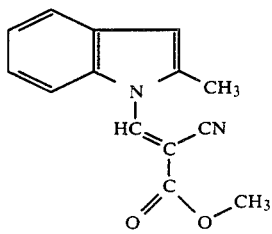

V

IV: $R^9$ = phenyl
VIII: $R^9$ = —(CH$_2$)$_{17}$—CH$_3$
IX: $R^9$ = H

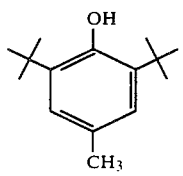

VI

-continued

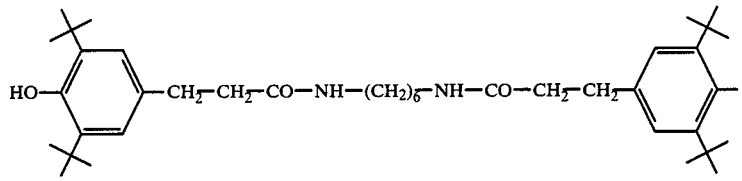

TABLE 1

Effect of weathering on impact strength at −20° C.

| Example No. | Stabiliser | Concentration of stabiliser % | Residual impact strength (kJ/m²) Weathering time | | | | |
|---|---|---|---|---|---|---|---|
| | | | 100 h. | 200 h. | 500 h. | 1000 h. | 1500 h. |
| 1 | none | — | 5 × 25.1 5 × ub$^x$ | 13.1 | — | — | — |
| 2 | CuI KI | 0.03 0.1 | ub | ub | 8 × ub 2 × 22.3 | 2 × ub 8 × 16.0 | 10.4 |
| 3 | VI | 0.5 | ub | ub | 6 × ub 4 × 12.5 | 16.3 | — |
| 4 | VI V | 0.5 0.2 | ub | ub | 9 × ub 1 × 27.2 | 5.4 | — |
| 5 | IV | 0.5 | ub | 10.3 | — | — | — |
| 6 | V | 0.2 | ub | 6.1 | — | — | — |
| 7° | IV V | 0.5 0.2 | ub | ub | 9 × ub 1 × 52.7 | 8 × ub 2 × 38.8 | 10.8 |
| 8° | VIII V | 0.5 0.2 | ub | ub | ub | 7 × ub 3 × 12.2 | 8.5 |
| 9° | IX V | 0.5 0.2 | ub ub | ub ub | 6 × ub 4 × 23.3 | 2 × ub 8 × 20.3 | 6.9 |
| 10 | IX standard light commercial stabiliser$^{xx}$ | 0.5 0.2 | ub | ub | 4 × ub 6 × 18.5 | 8.8 | — |
| 11 | IX standard commercial light stabiliser$^{xxx}$ | 0.5 0.2 | ub | ub | 2 × ub 8 × 15.8 | 6.6 | — |
| 12 | VII V | 0.5 0.2 | ub | ub | 8 × ub 2 × 15.8 | 8.2 | — |

$^x$ub = unbroken
$^{xx}$Tinuvin 320 ® (Ciba-Geigy GmbH)
$^{xxx}$Tinuvin 770 ® (Ciba-Geigy GmbH)
°Examples according to the invention

EXAMPLES 13 TO 16

Standard commercial, pigmented polyamide-6,6 having a relative viscosity of $\eta_{rel}=3{,}80$ reinforced with 40% of glass fibres was compounded in an extruder with a combination according to the invention of 0.2 by weight of the indole derivative of formula V and 0.5% by weight of the cyclic phosphorous acid ester of formula IV (percentage contents based on the total quantity of PA 66+glass fibres. A blue, red, green and yellow colour finish produced with customary polyamide pigments were used. The material was injection moulded to form small highgloss plates measuring 4 cm×6 cm which were artificially weathered for 400 hours in an SKB-weatherometer (for conditions, see Examples 1 to 12). Identical small plates of the identical but unstabilised, material and the identical polyamide-66 but stabilised with an inorganic stabiliser based on copper salt/halide, were subjected to weathering. Table 2 shows the loss of colour of the weathered plates compared with unweathered plates, as measured in MAE (CIELAB), and the gloss value for two colours (measurements on multigloss, 60°, in accordance with DIN 67 503) before and after weathering.

TABLE 2

| Example No. | Colour | Stabiliser | Loss of colour (MAE) after weathering | Gloss value (%) unweathered | Gloss value (%) after weathering |
|---|---|---|---|---|---|
| 13 | blue | stabilised in accordance with the invention | 3.9 | 66 | 56 |
| | | copper/halogen | 3.2 | 84 | 56 |
| | | none | 5.6 | 71 | 31 |
| 14 | red | stabilised in accordance with the invention | 9.7 | 55 | 51 |
| | | copper/halogen | 15.1 | 64 | 43 |
| | | none | 25.8 | 86 | 38 |

TABLE 2-continued

| Example No. | Colour | Stabiliser | Loss of colour (MAE) after weathering | Gloss value (%) unweathered | Gloss value (%) after weathering |
|---|---|---|---|---|---|
| 15 | green | stabilised in accordance with the invention | 2.9 | | |
| | | copper/halogen | 14.8 | | |
| | | none | 19.4 | | |
| 16 | yellow | stabilised in accordance with the invention | 27.3 | | |
| | | copper/halogen | 67.7 | | |
| | | none | 59.9 | | |

EXAMPLE 17

Standard commercial, red-pigmented reinforced polyamide-6 having a relative viscosity of $\eta_{rel}=3,8$ and containing 30% by weight of glass fibres was compounded in an extruder with a combination of 0.2 of the indole derivative of formula V and 0.5% of the cyclic phosphorous acid ester of formula IV (percentage contents based on the total quantity pf PA-6+glass fibre). The material was injection-moulded to form small high-gloss plates measuring 4 cm×6 cm which were artificially weathered in an SKB-weatherometer (for conditions, see Examples 1 to 12). Small plates of the identical, but unstabilised polyamide were subjected to the same treatment for comparison. Table 3 below shows the loss of colour of the weathered plates compared with unweathered plates, as measured in MAE (CIE-LAB), as a function of the weathering time.

TABLE 3

| | Loss of colour according to CIELAB (MAE) | |
|---|---|---|
| Weathering time (hours) | Stabilised test specimens | Unstabilised test specimens |
| 400 | 1.7 | 50.4 |
| 800 | 10.4 | 50 |
| 1600 | 26.6 | 50 |

We claim:

1. A weather-resistant polyamide moulding composition containing a stabilizer combination consisting essentially of:

(1) a phosphorous acid ester corresponding to the formula (I):

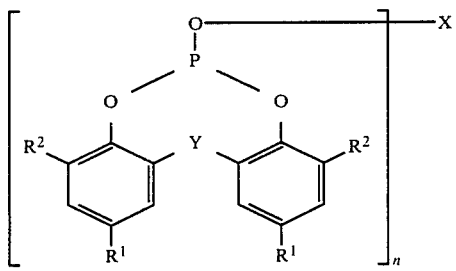

in which $R^2$ in each case independently represents a benzyl, α-methylbenzyl, α,α-dimethylbenzyl, cyclopentyl of cyclohexyl radical, $R^1$ in each case independently represents an alkyl radical, a cycloalkyl radical, in an aralkyl radical or an aryl radical, Y in each case independently represents S or HC-$R^3$ where $R^3$ represents H, an alkyl radical or a cyclohexyl radical, X represents a hydrogen atom, a single-bond to four-bond straight-chain or branched aliphatic radical, an aralkyl radical or an aromatic radical; each of the radicals may contain at least one olefinic double bond and/or a heteroatom selected from N, O and S, and n is an integer of from 1 to 4, with proviso that, where X is H, n is 1, and (2) an indole derivative corresponding to the formula (II):

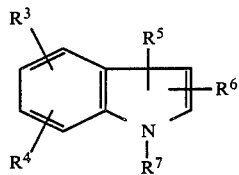

in which $R^3$ to $R^6$ may be the same or different and represent a hydrogen atom, an alkyl, aryl, aralkyl, cycloalkyl, hydroxy, alkoxy or alkenyl radical, and $R^7$ represents an alkenyl, aryl or acyl group unsubstituted or substituted by —$OR^8$, —CN or —$COOR^8$ wherein $R^8$ is alkyl having 1 to 6 carbon atoms or cycloalkyl having 5 or 6 carbon atoms; and wherein the total stabilizer composition is 0.04 to 5% by weight and compound (II) amounts to 0.02 to 3% by weight of the moulding composition.

2. A polyamide composition as claimed in claim 1, wherein the heteroatom, when present in the group X, is N, O and/or S.

3. A polyamide composition as claimed in claim 1, wherein
$R^1$ represents methyl,
$R^2$ represents $C_5$-$C_6$ cycloalkyl,
Y represents sulphur, or —$CH_2$—, and
X represents H, phenyl or alkyl.

4. A polyamide composition as claimed in claim 1 wherein
$R^3$ to $R^5$ represent H,
$R^6$ represents methyl, and
$R^7$ represents alkenyl.

5. A polyamide composition as claimed in claim 1, which contains from 0.1 to 2% by weight of the stabilizer combination.

6. A polyamide composition as claimed in claim 1, which contains from 0.05 to 1% by weight of the compound (II) of the stabiliser combination.

7. A polyamide composition as claimed in claim 1, wherein the polyamide is a polyamide-6 or polyamide-6,6.

8. A polyamide composition as claimed in claim 1, which is reinforced with glass fibres.

9. Moulded products produced from a polyamide composition as claimed in claim 1.

* * * * *